US006911302B2

(12) United States Patent
Moon et al.

(10) Patent No.: US 6,911,302 B2
(45) **Date of Patent: *Jun. 28, 2005**

(54) COATING COMPOSITION FOR PHOTOGRAPHIC MATERIALS

(75) Inventors: Alice G. Moon, Penfield, NY (US); Mark P. Pavlik, Rochester, NY (US); Michael W. Orem, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/704,003

(22) Filed: Nov. 7, 2003

(65) Prior Publication Data

US 2004/0170933 A1 Sep. 2, 2004

Related U.S. Application Data

(63) Continuation-in-part of application No. 10/193,340, filed on Jul. 11, 2002, now abandoned.

(51) Int. Cl.[7] ............................ G03C 1/38; G03C 1/85; C09D 101/26; C09D 189/00; C09D 103/02

(52) U.S. Cl. ....................... 430/528; 430/529; 430/633; 430/636; 106/154.3; 106/154.4; 106/170.2; 106/170.26; 106/205.6; 252/500; 516/200; 516/203

(58) Field of Search ................................. 430/527, 528, 430/529, 635, 636; 252/500; 106/154.3, 154.4, 170.2, 170.26, 170.46, 205.6; 516/200, 203

(56) References Cited

U.S. PATENT DOCUMENTS

| | | | | |
|---|---|---|---|---|
| 4,167,414 | A | | 9/1979 | Morgan |
| 4,267,087 | A | | 5/1981 | Mueller |
| 4,582,781 | A | | 4/1986 | Chen et al. |
| 4,923,790 | A | | 5/1990 | Kato et al. |
| 4,997,752 | A | | 3/1991 | Sasaki et al. |
| 5,185,240 | A | | 2/1993 | Miyata et al. |
| 5,198,329 | A | | 3/1993 | Noguchi et al. |
| 5,620,840 | A | | 4/1997 | Maskasky |
| 5,667,955 | A | | 9/1997 | Maskasky |
| 5,876,913 | A | | 3/1999 | Dickerson et al. |
| 5,888,712 | A | | 3/1999 | Lelental et al. |
| 5,955,255 | A | * | 9/1999 | Gerlach et al. |
| 6,200,723 | B1 | | 3/2001 | Dickerson |
| 6,232,058 | B1 | | 5/2001 | Adin et al. |
| 6,287,754 | B1 | | 9/2001 | Melpolder et al. |
| 6,468,710 | B1 | * | 10/2002 | Yasuda |
| 6,589,723 | B2 | * | 7/2003 | Yamanouchi et al. |
| 6,699,648 | B2 | * | 3/2004 | Sakizadeh et al. |
| 2003/0148232 | A1 | * | 8/2003 | Orem et al. |

FOREIGN PATENT DOCUMENTS

| | | |
|---|---|---|
| EP | 0 429 240 B1 | 5/1991 |
| EP | 0 331 319 B1 | 1/1994 |
| EP | 0 924 561 A1 | 6/1999 |
| EP | 0 994 388 A1 | 4/2000 |
| EP | 1 296 182 A1 | 3/2003 |
| EP | 1 296 183 A1 | 3/2003 |

OTHER PUBLICATIONS

US 5,837,440, 11/1998, Gerlach et al. (withdrawn)
*Research Disclosure*, Sep. 1996, Item 38957.
**Reserach Disclosure*, Feb. 1978, Item 16630.

* cited by examiner

*Primary Examiner*—Richard L. Schilling
(74) *Attorney, Agent, or Firm*—Doreen M. Wells; J. Lanny Tucker

(57) ABSTRACT

A coating composition for use in a photographic element, the composition comprising an aqueous solution of: two or more surfactants; a hydrophilic binder; and optional matte particles; wherein one of the surfactants is represented by the following Formula (I):

$$R_f\text{—}CH_2CH_2\text{—}(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;
B is a divalent linking group; y is 0 or 1; and A is an anionic group with a counterion or an amphoteric group. A photographic element containing the coating composition is also disclosed.

20 Claims, No Drawings

COATING COMPOSITION FOR PHOTOGRAPHIC MATERIALS

This application is a continuation in part of U.S. Ser. No. 10/193,340 filed Jul. 11, 2002, now abandoned.

FIELD OF THE INVENTION

The present invention relates in general to light-sensitive, photographic elements such as radiographic and laser imaging films and to coating compositions that provide them protection from the adverse effects of uncontrolled static charging. The invention provides reduced levels of keeping fog. More specifically, the elements comprise a support material, one or more image forming layers, and overcoat layers protecting the image forming layers; the photographic elements contain the coating compositions of the invention which provide protection from the adverse effects of excessive static charging.

BACKGROUND OF THE INVENTION

It is well known that the excessive generation, accumulation, and sparking discharge of electrostatic charges during the manufacture and use of photographic film and paper products are undesirable. Electrostatic charges may be generated in these materials by frictional contact with and separation from dissimilar materials such as transport rollers. The accumulation of static charge on film or paper surfaces can cause irregular static marking fog patterns in the emulsion layer. The presence of static charge can also lead to difficulties in support conveyance as well as the attraction of dust that can result in fog, desensitization, and other physical defects during emulsion coating. The discharge of accumulated charge during or after the application of the sensitized emulsion layer(s) also can produce irregular fog patterns or "static marks" in the emulsion layer. Sheet films are especially subject to static charging during use in automated high-speed film cassette loaders and laser imagers (e.g., x-ray, graphic arts films).

One of the most widely used methods for preventing the excessive generation of electrostatic charges on photographic film and paper products is to add surface active compounds or surfactants to overcoat or other layers, which reduces the amount of charge generated on the overcoat surfaces as described above. It is also a common practice to add coating aid surfactants to overcoat layers to improve the layer thickness uniformity of the layers, especially in coating methods for the simultaneous application of two or more layers.

The polarity of the static charges formed by frictional contact on the surfaces of most gelatin-containing overcoat compositions that also contain hydrocarbon coating aid surfactants incorporated for improved coating uniformity during the coating process, is usually a positive polarity. However, when surfactants containing highly fluorinated alkyl groups in their hydrophobic ends are incorporated into overcoat compositions, the resulting static charging of the overcoat surfaces by frictional contact is reduced in its magnitude of positive polarity or becomes closer to neutral or even negative in polarity. The extent of change in charging behavior depends on the amount of fluorinated surfactant used and its molecular structure, which influences its relative effectiveness in negative charging. The composition and amount of the fluorinated surfactant incorporated in the overcoat layer or other layer, in combination with the hydrocarbon coating aid surfactants and other addenda in the overcoat layer, are selected for optimal performance of the product type under conditions of its manufacture and use. When an effective fluorinated surfactant is used at its optimum amount, the electrostatic charging propensity of the overcoat surface is minimized under those conditions of handling and transport during manufacturing and in automated film handling and exposure equipment which are most likely to cause unwanted static charge buildup and static marking.

Not all fluorinated surfactants are equally effective in exhibiting this negative charging property when present in overcoat layer compositions containing hydrocarbon coating aid surfactants and other addenda such as lubricants. The length of the fluorinated carbon chain and the total number of fluorine atoms and their relative positions on the chain, as well as the composition of other groups in the surfactant molecule, are important factors in influencing the negative charging effectiveness of the surfactant. If the number of fluorinated carbon atoms in a surfactant molecule with one or two fluorinated carbon chains is too few, the negative charging property is greatly diminished. If the number of fluorinated carbon atoms is too many, the solubility of the surfactant in water solutions is too low to be of practical use.

Nonionic fluorinated surfactants useful as coating aids and for the control of electrostatic charging in overcoat layers of photographic elements are disclosed in Chen, et al., U.S. Pat. No. 4,582,781. A combination of two surfactants for the overcoat layers of both sides of a duplitized black and white X-ray recording material, wherein one of the surfactants is a mixture of $R_f—CH_2CH_2—S—CH(COOH)CHC(=O)HN—CH_2CH_2CH_2N(CH_3)_2$, and $R_f—CH_2CH_2—S—CH(CH_2COOH)C(=O)HN—CH_2CH_2CH_2N(CH_3)_2$ is disclosed by Adin, et al., U.S. Pat. No. 6,232,058. A black and white silver halide motion picture sound recording film overcoated with a layer containing a combination of three surfactants, including a mixture of $R_f—CH_2CH_2—S—CH(COOH)CHC(=O)HN—CH_2CH_2CH_2N(CH_3)_2$, and $R_f—CH_2CH_2—S—CH(CH_2COOH)C(=O)HN—CH_2CH_2CH_2N(CH_3)_2$ is disclosed by Gerlach, et al., U.S. Pat. No. 5,837,440.

In the past the most readily available fluorinated surfactants which have been especially effective for adjusting static charging properties of photographic film and paper products have been those with a large fraction of perfluoro-octyl groups. Furthermore, many of the fluorinated surfactants are either perfluoro-octyl sulfonate in their original form or have structures that may degrade to a perfluoro-octyl sulfonate compound. Recent reports indicate perfluoro-octyl sulfonate may accumulate in the blood systems of humans and animals and show toxicity in laboratory animals at high chronic levels of ingestion. Therefore there is interest in identifying alternative surfactants that do not exhibit these characteristics. Fluorinated surfactants that do not break down to perfluoro-octyl sulfonate or that accumulate less than perfluoro-octyl sulfonate in the blood system of animals are desired.

Telomer-formed compounds with $F(CF_2CF_2)_x—CH_2—CH_2—$ groups cannot break down to perfluoro-alkyl sulfonate. Quantitative Structure Activity Relationships analyses based on computer software available from SRC (Syracuse Research Corporation) indicate that fluorinated surfactants with telomer-formed fluoroalkyl groups and especially groups which have six or fewer fluorinated carbons (and ethylene groups directly bonded to them) present a lower risk of bio-accumulation.

In addition, fluorinated surfactants used in overcoat layers of photographic elements must have good solubility in the coating solutions of the overcoat layers and provide control of static electric charge, without exhibiting adverse effects on the coating uniformity of the overcoat layer or the underlying image forming layers. An additional requirement is that the surfactants of the protective overcoat layer should not adversely change the photographic performance of underlying image-forming layers.

It would be desirable to provide the industry with fluorinated surfactants that not only satisfy these requirements but also are environmentally acceptable.

SUMMARY OF THE INVENTION

The present invention discloses a multilayer imaging element which includes a support, one or more image-forming layers superposed on one or both sides of the support; and an outermost transparent overcoat layer superposed on one or both sides of the support. The invention also discloses a coating composition that includes a fluorosurfactant. The coating composition forms a layer that demonstrates improved static electric charging properties.

Hence, the invention discloses a coating composition for use in forming an overcoat layer in a photographic element, said composition comprising an aqueous solution of:

two or more surfactants, where only one of the surfactants is fluorinated;

a hydrophilic binder; and matte particles;

wherein the only one fluorinated surfactant is represented by the following Formula (I):

$$R_f\text{—}CH_2CH_2\text{—}(B)_y\text{-}A \qquad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or an amphoteric betaine group.

The invention also discloses a photographic element comprising:

a) a support;

b) at least one image-forming layer; and c) an overcoat layer comprising:

i) two or more surfactants, where only one of the surfactants is fluorinated;

ii) a hydrophilic binder; and iii) matte particles;

wherein the only one fluorinated surfactant is represented by the following Formula (I):

$$R_f\text{—}CH_2CH_2\text{—}(B)_y\text{-}A \qquad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or an amphoteric betaine group.

The coating composition of the invention provides improved photographic performance upon keeping, with reduced processed density in unexposed areas (Dmin). Dmin values which are as low as possible are preferred for radiographic films, because increased Dmin results in reduced contrast and decreased ability to detect detail in exposed areas of low image density. The composition also provides favorable static charging properties in automatic film handling equipment, while also maintaining good solution quality and coating uniformity of the overcoat and underlying image forming layers. In addition, the composition includes fluorinated surfactants with telomer-formed fluoroalkyl groups, which provide lower risk of bio-accumulation than perfluoro-octyl sulfonate and similar non-telomer perfluorinated compounds.

DETAILED DESCRIPTION OF THE INVENTION

The coating composition of the present invention contains at least two surfactants, including a compound of the following Formula I:

$$R_f\text{—}CH_2CH_2\text{—}(B)_y\text{-}A \qquad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or an amphoteric betaine group.

The invention also discloses a photographic element comprising:

a) a support;

b) at least one image-forming layer; and c) an overcoat layer comprising:

i) two or more surfactants, where only one of the surfactants is fluorinated;

ii) a hydrophilic binder; and iii) matte particles;

wherein the only one fluorinated surfactant is represented by the following Formula (I):

$$R_f\text{—}CH_2CH_2\text{—}(B)_y\text{-}A \qquad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or an amphoteric betaine group.

Examples of compounds of Formula I are:

$R_f\text{—}CH_2CH_2\text{—}SO_3^-[^+NR_4]$, where $NR_4$ is a substituted ammonium ion, and $R_f\text{—}CH_2CH_2SO_2N(H)CH_2CH_2CH_2N^-(CH_3)_2CH_2CO_2^-$ where $R_f$ is as defined above.

It is understood that the invention is not limited to the structures given in these examples. The synthetic process produces a mixture of compounds. Therefore, the subscript "n" represents the number of $(CF_2CF_2)$ groups and is a mixture of 3 and 4 or a mixture of 3, 4, and 5, and n is 3 in at least 40%, preferably in at least 60%, and most preferably in at least 90% of the $R_f$ groups present.

The element of the invention includes a layer containing the compound according to Formula I in a laydown of 0.1 to 25 milligrams per square meter and preferably 0.5 to 15 milligrams per square meter.

The silver halide emulsion layers and other hydrophilic layers on one or both sides of the support of the photographic material generally contain conventional polymer vehicles (peptizers and binders) that include both synthetically prepared and naturally occurring colloids or polymers. The most preferred polymer vehicles include gelatin or gelatin derivatives alone or in combination with other vehicles. Conventional gelatino-vehicles and related layer features are disclosed in *Research Disclosure*, September 1996, Item 38957, Section II. Vehicles, vehicle extenders, vehicle-like addenda and vehicle related addenda. (*Research Disclosure* is published by Kenneth Mason Publications, Ltd., Dudley Annex, 12A North Street, Emsworth, Hampshire PO10 7DQ, ENGLAND. This publication will be identified hereafter by the term, "*Research Disclosure*", the disclosures of which are incorporated by reference.) The emulsions themselves can contain peptizers of the type set out in Section II, paragraph A. Gelatin and hydrophilic colloid peptizers. The hydrophilic colloid peptizers are also useful as binders and hence are commonly present in much higher concentrations than required to perform the peptizing function alone. The preferred gelatin vehicles include alkali-treated gelatin, acid-treated gelatin or gelatin derivatives (such as acetylated gelatin, deionized gelatin, oxidized gelatin and phthalated gelatin). Cationic starch used as a peptizer for tabular grains is described in U.S. Pat. No. 5,620,840 (Maskasky) and U.S. Pat. No. 5,667,955 (Maskasky). Both hydrophobic and hydrophilic synthetic polymeric vehicles can be used also. Such materials include, but are not limited to, polyacrylates (including polymethacrylates), polystyrenes and polyacrylamides (including polymethacrylamides). Dextrans can also be used. Examples of such materials are described for example in U.S. Pat. No. 5,876,913 (Dickerson et al), incorporated herein by reference.

Photographic emulsion layers and other layers of photographic elements of the present invention such as overcoat layers, interlayers and subbing layers can also contain, alone or in combination with hydrophilic water-permeable colloids as vehicles or vehicle extenders (e.g., in the form of latices), synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkyl sulfonic acid copolymers, sulfoalkyl acrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides, compounds containing semicarbazone or alkoxy carbonyl hydrazone groups, polyester latex compositions, polystyryl amine polymers, vinyl benzoate polymers, carboxylic acid amide latices, copolymers containing acrylamidophenol cross-linking sites, vinyl pyrrolidone, colloidal silica and the like as described on pages 600–601 in *Research Disclosure*, Item 38957 (Photographic Silver Halide Emulsions, Preparations, Addenda, Systems, and Processing), Gelatin and gelatin derivative containing layers of the photographic elements of the invention can be protected against by biological degradation by the addition of agents for arresting biological activity (biocides and/or biostats), such as illustrated by Kato et al U.S. Pat. No. 4,923,790, Sasaki et al U.S. Pat. No. 4,997,752, Miyata et al U.S. Pat. No. 5,185,240, Noguchi et al U.S. Pat. No. 5,198,329, Wada EPO 0 331 319, and Ogawa et al EPO 0 429 240.

The silver halide emulsion layers (and other hydrophilic layers) in the photographic materials of this invention containing cross-linkable colloids, particularly the gelatin-containing layers, are generally hardened using one or more conventional hardeners.

Conventional hardeners can be used for this purpose, including but not limited to formaldehyde and free dialdehydes such as succinaldehyde and glutaraldehyde, blocked dialdehydes, α-diketones, active esters, sulfonate esters, active halogen compounds, s-triazines and diazines, epoxides, aziridines, active olefins having two or more active bonds, blocked active olefins, carbodiimides, isoxazolium salts unsubstituted in the 3-position, esters of 2-alkoxy-N-carboxydi-hydroquinoline, N-carbamoyl pyridinium salts, carbamoyl oxypyridinium salts, bis(amidino) ether salts, particularly bis(amidino) ether salts, surface-applied carboxyl-activating hardeners in combination with complex-forming salts, carbamoylonium, carbamoyl pyridinium and carbamoyl oxypyridinium salts in combination with certain aldehyde scavengers, dication ethers, hydroxylamine esters of imidic acid salts and chloroformamidinium salts, hardeners of mixed function such as halogen-substituted aldehyde acids (e.g., mucochloric and mucobromic acids), onium-substituted acroleins, vinyl sulfones containing other hardening functional groups, polymeric hardeners such as dialdehyde starches, and copoly(acrolein-methacrylic acid). The hardeners can be used alone or in combination and in free or in blocked form.

The photographic element layers of this invention can contain various types of coating aid surfactants, such as anionic or nonionic surfactants, alone or in combination. Some useful coating aids are sulfonated alkylaryl polyethers as illustrated by Baldsiefen U.S. Pat. No. 2,600,831, Knox et al U.S. Pat. Nos. 2,719,087 and 3,026,202, Sakamoto et al U.S. Pat. No. 4,192,683 and Nishio et al U.S. Pat. No. 3,415,649; alkylene glycol ethers of polyhydric alcohols as disclosed by Swan et al U.S. Pat. No. 2,240,469, Swan U.S. Pat. No. 2,240,472, Knox et al U.S. Pat. No. 2,831,766, Seidel et al U.S. Pat. No. 3,409,435, Eiseman et al U.S. Pat. No. 3,442,654, Knox U.S. Pat. No. 3,514,293, Padday U.S. Pat. No. 3,516,844, Gantz et al U.S. Pat. No. 3,617,292, Wagner et al U.K. Patent 774,806, U.K. Patent 1,022,878 and Milton U.K. Patent 1,201,054; various types of monoesters derived from polyhydroxy compounds as disclosed in Boomer U.S. Pat. No. 2,190,645, Swan U.S. Pat. No. 2,240,470, Simmons U.S. Pat. No. 2,240,475, Swan et al U.S. Pat. No. 2,353,279, Knox et al U.S. Pat. No. 3,220,847, Hagge et al U.S. Pat. No. 3,516,833 and U.K. Patent 1,012,495.

For purposes of the present invention, preferred coating aid surfactants include, but are not limited to, alkyl phenoxy polyglycidyl alcohols, alkyl mono- and oligo-glucopyranosides, alkyl aryl polyether sulfates or sulfonates, and alkyl sulfosuccinate esters. The ratio of fluorinated surfactant to coating aid surfactant is preferably 1:100 to 1:0.5 by weight. Coating compositions falling within this range may be selected according to the specific surfactant combinations provided that solution quality, coating quality, and favorable charging performance characteristics are maintained.

The flexibility of the silver halide emulsion and other hydrophilic colloid-containing layers of the photographic elements of the invention upon drying can be improved through the incorporation of plasticizers. Representative plasticizers include alcohols, dihydric alcohols, trihydric alcohols and polyhydric alcohols, acid amides, cellulose derivatives, lipophilic couplers, esters, phosphate esters such as tricresyl phosphate, glycol esters, diethylene glycol mixed esters, phthalate esters such as dibutyl phthalate and butyl stearate, tetraethylene glycol dimethyl ether, ethyl acetate copolymers, lactams, lower alkyl esters of ethylene bis-glycolic acid, ether esters or diesters of an alkylene glycol or a polyalkylene glycol, polyacrylic acid esters, polyethylene imines, poly(vinyl acetate) and polyurethanes, as illustrated by Eastman et al U.S. Pat. No. 306,470, Wiest U.S. Pat. No. 3,635,853, Milton et al U.S. Pat. No. 2,960,404, Faber et al U.S. Pat. No. 3,412,159, Ishihara et al U.S. Pat. No. 3,640, 721, Illingsworth et al U.S. Pat. No. 3,003,878, Lowe et al U.S. Pat. No. 2,327,808, Umberger U.S. Pat. No. 3,361,565, Gray U.S. Pat. No. 2,865,792, Milton U.S. Pat. Nos. 2,904, 434 and 2,860,980, Milton et al U.S. Pat. No. 3,033,680, Dersch et al U.S. Pat. No. 3,173,790, Fowler U.S. Pat. No. 2,772,166 and Fowler et al U.S. Pat. No. 2,835,582, Van-Paesschen et al U.S. Pat. No. 3,397,988, Balle et al U.S. Pat. No. 3,791,857, Jones et al U.S. Pat. No. 2,759,821, Ream et al U.S. Pat. No. 3,287,289 and DeWinter et al U.S. Pat. No. 4,245,036.

The photographic elements of the present invention can contain lubricants to reduce sliding friction encountered in use. Representative lubricants which can be used in photographic elements include the following and are usually dispersed in droplet form: silicone derivatives, polymeric silicone compounds plus ō-alanine-derivative surfactants, mixtures of an alkyl silicone and an aryl silicone, phosphate triesters, paraffins and waxes such as carnauba wax, as illustrated by Guestaux et al U.S. Pat. Nos. 3,082,087 and 3,658,573, Robijns U.S. Pat. No. 2,588,765, Nellist et al U.K. Patent 1,263,722, Harriman U.S. Pat. No. 3,018,178, Brown et al U.K. Patents 1,320,564 and 1,320,757, Duane U.S. Pat. No. 3,121,060, DeBoer et al, *Research Disclosure*, Vol. 139, November, 1975, Item 13969, Mackey et al U.S. Pat. No. 3,870,521, Stephens U.S. Pat. No. 3,679,411, McGraw U.S. Pat. No. 3,489,567, Ben-Ezra U.S. Pat. No. 3,042,522, U.K. Patent 955,061, Tallet et al U.S. Pat. No. 3,080,317, Earhart et al U.S. Pat. No. 3,516,832, Knox et al U.S. Pat. No. 2,739,891, Secrist et al U.S. Pat. No. 3,295, 979, Nadeau et al U.S. Pat. No. 3,222,178 and Guestaux French Patent 2,180,465, Shibue et al U.K. Patent Application 2,027,221, Naoi et al U.S. Pat. No. 4,232,117, Sugimoto et al U.S. Pat. No. 4,675,278, Yoneyama et al U.S. Pat. No. 5,063,147, Takeuchi U.S. Pat. No. 5,019,491 Shiba et al U.S. Pat. No. 4,866,469, Geiger et al U.S. Pat. No. 5,288,602 and Miyamoto EPO 0 668 534.

The layers of the photographic elements of the invention can contain matting agents for such purposes as prevention of blocking and ferrotyping, reduction of static charging and excessive sheen, and physical durability. Finely divided organic particles or beads can be used in the invention as matting agents, such as polymeric materials—including various forms of cellulose and polymers or copolymers of $\alpha,\beta$-ethylenically unsaturated mono- and di-carboxylic acids, esters and half-esters and their sulfonic acid analogues (particularly acrylic and methacrylic acids and their methyl esters), styrene, acrylonitrile and fluorinated ethylenes, as well as polycarbonate and poly(vinyl alcohol), as illustrated by Jelley U.S. Pat. No. 1,939,213, Knoefel U.S. Pat. Nos. 2,221,873 and 2,268,662, Lindquist U.S. Pat. No. 2,322,037, Plakunov U.S. Pat. No. 3,591,379, Potter et al U.S. Pat. No. 2,376,005, Jelley et al U.S. Pat. No. 2,992,101, Minsk et al U.S. Pat. No. 2,391,181, Lynn U.S. Pat. No. 2,701,245, Earhart et al U.S. Pat. No. 3,516,832, Morcher et al U.S. Pat. No. 3,079,257, Grabhoefer et al U.S. Pat. No. 3,443,946, Klockgether et al U.S. Pat. No. 3,262,782, U.K. Patent 1,055,713, De Geest et al U.S. Pat. No. 3,754,924 and Hutton U.S. Pat. No. 3,767,448. Vinyl chloride polymers or copolymers can be used as illustrated by Roth et al U.K. Patent 2,033,596, copolymers of fluorinated monomers and silicon-containing monomers as described in Japanese Patent Application JA 62/17744, and copolymers of maleic anhydride and olefins as illustrated by Brück et al U.S. Pat. No. 4,287,299. The particle surfaces can be linked to gelatin, as illustrated by Bagchi et al EPO 0 307 855.

Matte particles are optional and may be of a range of sizes and of various shapes, for example, irregular as in the case of silica particles or spherical as in the case of many organic polymer mattes. The particles can be monodisperse as illustrated in *Research Disclosure*, Vol. 216, April, 1982, Item 21617. The particles may have a bimodal size distribution, as disclosed in U.S. Pat. Nos. 5,550,011 and 5,595,862. The particles can be porous, as illustrated by Naito, U.S. Pat. No. 4,094,848. The matte particles can be pigmented or dyed, as illustrated by Heigold et al U.S. Pat. No. 4,172,731. The matte can be resistant to removal in the process, as illustrated by Ishii U.S. Pat. No. 4,396,706. The particles can be alkali-swellable but not removable, as illustrated by Brück et al U.S. Pat. No. 4,301,240.

Photographic elements of the invention employ silver halide emulsion grains as the light sensitive material in the imaging layers. The composition of the grains may be any combination of silver with the halides, chloride, bromide, and iodide, as described in *Research Disclosure*, Item 38957. As disclosed in *Research Disclosure* Item 38957 (pages 592–598), the grain morphology may be tabular or non-tabular; the crystal faces may be parallel to the (100) or (111) crystallographic planes of the face-centered cubic crystal lattice; the size distribution may be polydisperse, uniform, or bimodal; the internal structure of the halide composition may be uniform or may vary continuously or abruptly; composite grains may be formed by epitaxial deposition; and the grains may be modified by halide conversion. Precipitation procedures are illustrated in *Research Disclosure*, Item 38957. Silver halide grains may be modified by introduction of reducing agents or the inclusion of dopants as described in *Research Disclosure*, Item 38957. Useful dopants and combinations of dopants are also described Johnson, et al., U.S. Pat. No. 5,164,292, and in Olm, et al., U.S. Pat. No. 5,360,712.

The silver halide to be used in the invention may be advantageously subjected to chemical sensitization. Compounds and techniques useful for chemical sensitization of silver halide are known in the art and described in *Research Disclosure*, Item 38957 and the references cited therein. Compounds useful as chemical sensitizers, include, for example, active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 4 to 8, and temperatures of from 30 to 80° C., as described in *Research Disclosure*, Item 38957, Section IV (pages 601–603) and the references cited therein. Particularly effective chemical sensitizers include the gold compounds disclosed in the references on page 602 of *Research Disclosure*, Item 38957 in combination with the sulfur sensitizers disclosed in the references on page 603 of *Research Disclosure*, Item 38957. Examples of especially useful chemical sensitization are disclosed in U.S. Pat. No. 4,810,626, U.S. Pat. No. 6,034,249, U.S. Pat. No. 5,945,270, U.S. Pat. No. 5,049,485, U.S. Pat. No. 5,049,484, and U.S. Pat. No. 5,220,030.

The emulsions useful in the invention may be spectrally sensitized using the compounds and methods described in *Research Disclosure*, Item 38957 (pages 603–608). Photographic elements, typically using one or more sensitizing dyes, having particular relationships of sensitivities at specified wavelength or wavelength ranges, are described in the references cited by *Research Disclosure*, Item 38957.

The addition of compounds useful in the invention as finish modifiers, supersensitizers, antifoggants, and stabilizers, is illustrated in *Research Disclosure*, Item 38957

(pages 606–610). Speed increasing compounds may be added to the emulsions as disclosed in Farid et al, U.S. Pat. Nos. 5,747,235, 6,010,841, 5,747,235, 6,153,371, 5,994, 051, 6,054,260, and by Allway, et al., in EPA 1 016 902.

A variety of supports are suitable for use in photographic elements of the invention. Typical photographic supports include polymeric film provided with one or more subbing layers. Typical of useful polymeric film supports are films of cellulose nitrate and cellulose esters (such as cellulose triacetate and diacetate), polystyrene, polyamides, homo- and copolymers of vinyl chloride, poly(vinyl acetal), polycarbonate, homo-and copolymers of olefins such as polyethylene and polypropylene, and polyesters of dibasic aromatic carboxylic acids with divalent alcohols such as poly(ethylene terephthalate) and poly(ethylene naphthalate). Cellulose acetate photographic film supports, methods of making, and applications thereof are set forth in Rieth U.S. Pat. No. 4,992,491, Suzuki et al U.S. Pat. No. 5,188,788, Machell et al U.S. Pat. No. 5,219,510, Nishiura et al EPO 0 479 260 and Tsujimoto et al EPO 0 535 652.

Preferred polyester film supports are comprised of linear polyester, such as illustrated by Alles et al U.S. Pat. No. 2,627,088, Wellman U.S. Pat. No. 2,720,503, Alles U.S. Pat. No. 2,779,684 and Kibler et al U.S. Pat. No. 2,901,466. Polyester films can be formed by varied techniques as illustrated by Alles, cited above, Czerkas et al U.S. Pat. No. 3,663,683 and Williams et al U.S. Pat. No. 3,504,075, and can be modified for use as photographic film supports by subbing, etc., as illustrated by VanStappen U.S. Pat. No. 3,227,576, Nadeau et al U.S. Pat. Nos. 3,143,421 and 3,501,301, Reedy et al U.S. Pat. No. 3,589,905, Babbitt et al U.S. Pat. No. 3,850,640, Bailey et al U.S. Pat. No. 3,888, 678, Hunter U.S. Pat. No. 3,904,420, Mallinson et al U.S. Pat. No. 3,928,697, Van Paesschen et al U.S. Pat. No. 4,132,552, Schrader et al U.S. Pat. No. 4,141,735, McGrail et al U.S. Pat. No. 4,304,851, Kreil et al U.S. Pat. No. 4,594,262, and Bayless et al U.S. Pat. No. 4,645,731. The polyester film support can be discharge-treated and subbed with a polymer-gelatin composition cross-linkable with a gelatin hardener, as illustrated by Ponticello et al, U.S. Pat. Nos. 4,689,359 and 4,695,532. Polyester supports and related features are further illustrated by the following recent publications: Maier et al U.S. Pat. No. 5,034,263 and 4,994,312, Fukazawa U.S. Pat. No. 5,225,319, Kawamoto et al U.S. Pat. No. 4,978,740, Van Cappellen et al U.S. Pat. No. 4,892,689, Hiraoka et al U.S. Pat. No. 5,215,825, Nitta et al U.S. Pat. No. 5,188,774, Verheijen et al U.S. Pat. No. 5,185,426, Stevens et al U.S. Pat. No. 4,994,214, Satako et al U.S. Pat. No. 4,910,235, Brozek et al U.S. Pat. No. 5,138,024, Kiyohara et al U.S. Pat. Nos. 4,898,897 and 4,847,149 and EPO 0 327 768, Greener et al U.S. Pat. No. 5,288,601, Kawamoto U.S. Pat. No. 5,294,473, Sumner, Jr. et al U.S. Pat. No. 5,296,587, Jones et al U.S. Pat. No. 5,310,857, Kawamoto U.S. Pat. Nos. 5,350,829 and 5,368, 997, Kobayashi et al U.S. Pat. No. 5,372,925, Tsou et al U.S. Pat. No. 5,385,704, Yajima et al U.S. Pat. No. 5,387,501, Marien et al U.S. Pat. No. 5,411,843, Grace et al U.S. Pat. No. 5,425,980, Satake et al EPO 0 334 367, Nishiura et al EPO 0 496 346, Sakamoto et al EPO 0 510 654, Mochizuki et al EPO 0 517 506, Ueda et al EPO 0 518 260, Kobayashi et al EPO 0 545 439, EPO 0 566 094 and 0 572 275, Yajima et al EPO 0 568 268, Ueda et al EPO 0 562 533, Mostaert et al EPO 0 559 244, Araki et al EPO 0 568 268, Stevens et al EPO 0 582 750, Murayama EPO 0 583 787, Verheyen EPO 0 606 663, Nakanishi et al EPO 0 618 488, Kimura et al EPO 0 619 516, Okamoto et al EPO 0 636 928, Kawamoto et al EPO 0 658 804, Kawamoto et al EPO 0 674 218, Hashimoto et al EPO 0 677 778, Yajima et al EPO 0 681 211, Bennett et al WO 94/13480, and in Tetsuro et al German OLS 3,800,130.

The layers of the photographic element of this invention may be coated on the support by a variety of methods known in the art. Preferred methods are bead coating and curtain coating.

The overcoat composition of the present invention is particularly well-suited for radiographic films. In medical radiography an image of a patient's anatomy is produced by exposing the patient to X-rays and recording the pattern of penetrating X-radiation using a radiographic film containing at least one radiation-sensitive silver halide emulsion layer coated on a transparent support. X-radiation can be directly recorded by the emulsion layer where only low levels of exposure are required. Because of the potential harm of exposure to the patient, an efficient approach to reducing patient exposure is to employ one or more phosphor-containing intensifying screens in combination with the radiographic film (usually both in the front and back of the film). An intensifying screen absorbs X-rays and emits longer wavelength electromagnetic radiation that the silver halide emulsions more readily absorb.

Another technique for reducing patient exposure is to coat two silver halide emulsion layers on opposite sides of the film support to form a "dual coated" radiographic film so the film can provide suitable images with less exposure. Of course, a number of commercial products provide assemblies of both dual coated films in combination with two intensifying screens to allow the lowest possible patient exposure to X-rays. Typical arrangements of film and screens are described in considerable detail for example in U.S. Pat. No. 4,803,150 (Dickerson et al), U.S. Pat. No. 5,021,327 (Bunch et al) and U.S. Pat. No. 5,576,156 (Dickerson).

One important component of the films described in these patents is a microcrystalline dye located in a silver halide emulsion layer or antihalation layer that reduces "crossover" (exposure of an emulsion from light emitted by an intensifying screen on the opposite of the film support) to less than 10%. Crossover results in reduced image sharpness. These microcrystalline dyes are readily decolorized during the wet processing cycle so they are not visible in the resulting image.

Radiographic films that can be rapidly wet processed (that is, processed in an automatic processor within 90 seconds and preferably less than 45 seconds) are also described in the noted U.S. Pat. No. 5,576,156. Typical processing cycles include contacting with a black-and-white developing composition, desilvering with a fixing composition, and rinsing and drying. Films processed in this fashion are then ready for image viewing. In recent years, there has been an emphasis in the industry for more rapidly processing such films to increase equipment productivity and to enable medical professionals to make faster and better medical decisions.

The radiographic films of this invention include a flexible support having disposed on both sides thereof: two or more silver halide emulsion layers and optionally one or more non-radiation sensitive hydrophilic layer(s). The silver halide emulsions in the various layers can be the same or different, and can comprise mixtures of various silver halide emulsions in or more of the layers.

In preferred embodiments, the film has the same silver halide emulsion on both sides of the support, and closest to the support. The emulsion layers disposed farther from the support can also have the same silver halide emulsions. It is also preferred that the films have a protective overcoat (described below) over the silver halide emulsions on each side of the support.

The support can take the form of any conventional radiographic element support that is X-radiation and light transmissive. Useful supports for the films of this invention can be chosen from among those described in *Research Disclosure*, September 1996, Item 38957 XV. Supports and *Research Disclosure*, Vol. 184, August 1979, Item 18431, XII. Film Supports. *Research Disclosure* is published by Kenneth Mason Publications, Ltd., Dudley House, 12 North Street, Emsworth, Hampshire PO10 7DQ England.

The support is a transparent film support. In its simplest possible form the transparent film support consists of a transparent film chosen to allow direct adhesion of the hydrophilic silver halide emulsion layers or other hydrophilic layers. More commonly, the transparent film is itself hydrophobic and subbing layers are coated on the film to facilitate adhesion of the hydrophilic silver halide emulsion layers. Typically the film support is either colorless or blue tinted (tinting dye being present in one or both of the support film and the subbing layers). Referring to *Research Disclosure*, Item 38957, Section XV Supports, cited above, attention is directed particularly to paragraph (2) that describes subbing layers, and paragraph (7) that describes preferred polyester film supports.

In the more preferred embodiments, at least one non-light sensitive hydrophilic layer is included with the two or more silver halide emulsion layers on each side of the film support. This layer may be called an interlayer or overcoat, or both.

The silver halide emulsion layers comprise one or more types of silver halide grains responsive to X-radiation. Silver halide grain compositions particularly contemplated include those having at least 80 mol % bromide (preferably at least 98 mol % bromide) based on total silver. Such emulsions include silver halide grains composed of, for example, silver bromide, silver iodobromide, silver chlorobromide, silver iodochlorobromide, and silver chloroiodobromide. Iodide is generally limited to no more than 3 mol % (based on total silver) to facilitate more rapid processing. Preferably iodide is limited to no more than 2 mol % (based on total silver) or eliminated entirely from the grains.

The silver halide grains in each silver halide emulsion unit (or silver halide emulsion layers) can be the same or different, or mixtures of different types of grains.

The silver halide grains useful in this invention can have any desirable morphology including, but not limited to, cubic, octahedral, tetradecahedral, rounded, spherical or other non-tabular morphologies, or be comprised of a mixture of two or more of such morphologies. Preferably, the grains are tabular grains and the emulsions are tabular grain emulsions in each silver halide emulsion layer.

In addition, different silver halide emulsion layers can have silver halide grains of the same or different morphologies as long as at least 50% of the grains are tabular grains. For cubic grains, the grains generally have an ECD of at least 0.8 $\mu$m and less than 3 $\mu$m (preferably from about 0.9 to about 1.4 $\mu$m). The useful ECD values for other non-tabular morphologies would be readily apparent to a skilled artisan in view of the useful ECD values provided for cubic and tabular grains.

Generally, the average ECD of tabular grains used in the films is greater than 0.9 $\mu$m and less than 4.0 $\mu$m, and preferably greater than 1 and less than 3 $\mu$m. Most preferred ECD values are from about 1.6 to about 4.5 $\mu$m. The average thickness of the tabular grains is generally at least 0.1 and no more than 0.3 $\mu$m, and preferably at least 0.12 and no more than 0.18 $\mu$m.

It may also be desirable to employ silver halide grains that exhibit a coefficient of variation (COV) of grain ECD of less than 20% and, preferably, less than 10%. In some embodiments, it may be desirable to employ a grain population that is as highly monodisperse as can be conveniently realized.

Generally, at least 50% (and preferably at least 90%) of the silver halide grain projected area in each silver halide emulsion layer is provided by tabular grains having an average aspect ratio greater than 5, and more preferably greater than 10. The remainder of the silver halide projected area is provided by silver halide grains having one or more non-tabular morphologies.

Tabular grain emulsions that have the desired composition and sizes are described in greater detail in the following patents, the disclosures of which are incorporated herein by reference:

U.S. Pat. No. 4,414,310 (Dickerson), U.S. Pat. No. 4,425,425 (Abbott et al), U.S. Pat. No. 4,425,426 (Abbott et al), U.S. Pat. No. 4,439,520 (Kofron et al), U.S. Pat. No. 4,434,226 (Wilgus et al), U.S. Pat. No. 4,435,501 (Maskasky), U.S. Pat. No. 4,713,320 (Maskasky), U.S. Pat. No. 4,803,150 (Dickerson et al), U.S. Pat. No. 4,900,355 (Dickerson et al), U.S. Pat. No. 4,994,355 (Dickerson et al), U.S. Pat. No. 4,997,750 (Dickerson et al), U.S. Pat. No. 5,021,327 (Bunch et al), U.S. Pat. No. 5,147,771 (Tsaur et al), U.S. Pat. No. 5,147,772 (Tsaur et al), U.S. Pat. No. 5,147,773 (Tsaur et al), U.S. Pat. No. 5,171,659 (Tsaur et al), U.S. Pat. No. 5,252,442 (Dickerson et al), U.S. Pat. No. 5,370,977 (Zietlow), U.S. Pat. No. 5,391,469 (Dickerson), U.S. Pat. No. 5,399,470 (Dickerson et al), U.S. Pat. No. 5,411,853 (Maskasky), U.S. Pat. No. 5,418,125 (Maskasky), U.S. Pat. No. 5,494,789 (Daubendiek et al), U.S. Pat. No. 5,503,970 (Olm et al), U.S. Pat. No. 5,536,632 (Wen et al), U.S. Pat. No. 5,518,872 (King et al), U.S. Pat. No. 5,567,580 (Fenton et al), U.S. Pat. No. 5,573,902 (Daubendiek et al), U.S. Pat. No. 5,576,156 (Dickerson), U.S. Pat. No. 5,576,168 (Daubendiek et al), U.S. Pat. No. 5,576,171 (Olm et al), and U.S. Pat. No. 5,582,965 (Deaton et al). The patents to Abbott et al, Fenton et al, Dickerson and Dickerson et al are also cited and incorporated herein to show conventional radiographic film features in addition to gelatino-vehicle, high bromide (≧80 mol % bromide) tabular grain emulsions and other features useful in the present invention.

A variety of silver halide dopants can be used, individually and in combination, to improve contrast as well as other common properties, such as speed and reciprocity characteristics. A summary of conventional dopants to improve speed, reciprocity and other imaging characteristics is provided by *Research Disclosure*, Item 38957, cited above, Section 1. Emulsion grains and their preparation, sub-section D. Grain modifying conditions and adjustments, paragraphs (3), (4) and (5).

A general summary of silver halide emulsions and their preparation is provided by *Research Disclosure*, Item 38957, cited above, Section I. Emulsion grains and their preparation. After precipitation and before chemical sensitization the emulsions can be washed by any convenient conventional technique using techniques disclosed by *Research Disclosure*, Item 38957, cited above, Section III. Emulsion washing.

The emulsions can be chemically sensitized by any convenient conventional technique as illustrated by *Research Disclosure*, Item 38957, Section IV. Chemical Sensitization. Sulfur, selenium or gold sensitization (or any combination thereof) are specifically contemplated. Sulfur sensitization is preferred, and can be carried out using for example, thiosulfates, thiosulfonates, thiocyanates, isothiocyanates, thioethers, thioureas, cysteine or rhodanine. A combination of gold and sulfur sensitization is most preferred.

The emulsions can be spectrally sensitized to the emission wavelengths of intensifying screens by any convenient method as illustrated by *Research Disclosure*, Item 38957, section V. Spectral sensitization and Desensitization Instability that increases minimum density in negative-type emulsion coatings (that is fog) can be protected against by incorporation of stabilizers, antifoggants, antikinking agents, latent-image stabilizers and similar addenda in the emulsion and contiguous layers prior to coating. Such addenda are illustrated by *Research Disclosure*, Item 38957, Section VII. Antifoggants and stabilizers, and Item 18431, Section II. Emulsion Stabilizers, Antifoggants and Antikinking Agents.

It may also be desirable that one or more silver halide emulsion layers include one or more covering power enhancing compounds adsorbed to surfaces of the silver halide grains. A number of such materials are known in the art, but preferred covering power enhancing compounds contain at least one divalent sulfur atom that can take the form of a —S— or =S moiety. Such compounds include, but are not limited to, 5-mercapotetrazoles, dithioxotriazoles, mercapto-substituted tetraazaindenes, and others described in U.S. Pat. No. 5,800,976 (Dickerson et al) that is incorporated herein by reference for the teaching of the sulfur-containing covering power enhancing compounds. Such compounds are generally present at concentrations of at least 20 mg/silver mole, and preferably of at least 30 mg/silver mole. The concentration can generally be as much as 2000 mg/silver mole and preferably as much as 700 mg/silver mole.

On each side of the radiographic film, the minimal total level of silver is generally at least 15 $mg/dm^2$. In addition, the total coverage of polymer vehicle per side (that is, all layers on that side) is generally no more than 35 $mg/dm^2$, and preferably no more than 30 and generally at least 20 $mg/dm^2$. The amounts of silver and polymer vehicle on the two sides of the support can be the same or different. These amounts refer to dry weights.

The various coated layers of radiographic films can also contain tinting dyes to modify the image tone to transmitted or reflected light. These dyes are not decolorized during processing and may be homogeneously or heterogeneously dispersed in the various layers. Preferably, such non-bleachable tinting dyes are in a silver halide emulsion layer.

It may also be desirable to include the presence of one or more microcrystalline particulate dyes in the first and third silver halide emulsion layers (that is, those emulsion layers closest to and on opposing sides of the support). The presence of such dyes reduces crossover during film use in radiographic assemblies to less than 15%, preferably less than 10% and more preferably less than 5%. The amount in the film to achieve this result will vary on the particular dye(s) used, as well as other factors, but generally the amount of particulate dye is at least 0.5 $mg/dm^2$, and preferably at least 1 $mg/dm^2$, and up to 2 $mg/dm^2$.

The particulate dyes generally provide optical densities of at least 0.5, and preferably at least 1. Examples of useful particulate dyes and teaching of their synthesis are described in U.S. Pat. No. 5,021,327 (noted above, Cols. 11–50) and U.S. Pat. No. 5,576,156 (noted above, Cols. 6–7), both incorporated herein by reference for description of the dyes. Preferred particulate dyes are nonionic polymethine dyes that include the merocyanine, oxonol, hemioxonol, styryl and arylidene dyes. These dyes are nonionic in the pH range of coating, but ionic under the alkaline pH of wet processing. A particularly useful dye is 1-(4'-carboxyphenyl)-4-(4'-dimethylaminobenzylidene)-3-ethoxycarbonyl-2-pyrazolin-5-one (identified as Dye XOC-1 herein).

The dye can be added directly to the hydrophilic colloid as a particulate solid or it can be converted to a particulate solid after it has been added to the hydrophilic colloid, as described in U.S. Pat. No. 5,021,327 (Col. 49).

In addition to being present in particulate form and satisfying the optical density requirements described above, the dyes useful in the practice of this invention must be substantially decolorized during wet processing. The term "substantially decolorized" is used to mean that the density contributed to the image after processing is no more than 0.1, and preferably no more than 0.05, within the visible spectrum.

The various coated layers of radiographic films can also contain UV-absorbing compounds to reduce sensitivity of the sensitized emulsion layers to static marking. These compounds are solubilized during processing and may be homogenously or heterogeneously dispersed in the various layers or added directly to the hydrophilic colloid as a particulate solid. One example of a class of photographically useful UV-absorbing materials is substituted benzoic acid compounds. Other examples of such UV-absorbing compounds are described in *Research Disclosure*, September 1996, Item 38957, Section VI.

Radiographic imaging assemblies are commonly composed of a radiographic film (such as the type described above) and intensifying screens adjacent the front and back of the radiographic film. The screens are typically designed to absorb X-rays and to emit electromagnetic radiation having a wavelength greater than 300 nm. These screens can take any convenient form providing they meet all of the usual requirements for use in radiographic imaging, as described for example in U.S. Pat. No. 5,021,327 (noted above), incorporated herein by reference. A variety of such screens are commercially available from several sources, including by not limited to, LANEX™, X-SIGHT™ and InSight™ Skeletal screens available from Eastman Kodak Company. The front and back screens can be appropriately chosen depending upon the type of emissions desired, the photicity desired, whether the films are symmetrical or assymmetrical, film emulsion speeds, and percent crossover.

Exposure and processing of typical radiographic films can be undertaken in any convenient conventional manner. The exposure and processing techniques of U.S. Pat. No. 5,021,327 and 5,576,156 (both noted above), are typical for processing radiographic films. Other processing compositions (both developing and fixing compositions) are described in U.S. Pat. No. 5,738,979 (Fitterman et al), U.S. Pat. No. 5,866,309 (Fitterman et al), U.S. Pat. No. 5,871,890 (Fitterman et al), U.S. Pat. No. 5,935,770 (Fitterman et al), U.S. Pat. No. 5,942,378 (Fitterman et al), all incorporated herein by reference. The processing compositions can be supplied as single- or multi-part formulations, and in concentrated form or as more diluted working strength solutions.

It is particularly desirable that radiographic films be processed within 90 seconds, and preferably within 60 seconds and at least 30 seconds, including developing, fixing and any washing (or rinsing). Such processing can be carried out in any suitable processing equipment including but not limited to, a Kodak X-OMAT™ RA 480 processor that can utilize Kodak Rapid Access processing chemistry. Other "rapid access processors" are described for example in U.S. Pat. No. 3,545,971 (Barnes et al) and EP-A-0 248,390 (Akio et al). Preferably, the black-and-white developing compositions used during processing are free of any photographic film (for example, gelatin) hardeners, such as glutaraldehyde.

Since rapid access processors employed in the industry vary in their specific processing cycles and selections of processing compositions, radiographic films satisfying the requirements of the present invention include but are not limited to those that are capable of dry-to-dry processing according to the following reference conditions:

| | |
|---|---|
| Development | 11.1 seconds at 35° C., |
| Fixing | 9.4 seconds at 35° C., |
| Washing | 7.6 seconds at 35° C., |
| Drying | 12.2 seconds at 55–65° C. |

Any additional time is taken up in transport between processing step. Typical black-and-white developing and fixing compositions are described in the Example below.

Radiographic kits can include one or more samples of radiographic film employing the composition of this invention, one or more intensifying screens used in the radiographic imaging assemblies, and/or one or more suitable photographic processing compositions (such as black-and-white developing and fixing compositions). Preferably, the kit includes all of these components. Alternatively, the radiographic kit can include a radiographic imaging assembly as described herein and one or more of the noted photographic processing compositions.

In recent years a number of alternative approaches to medical diagnostic imaging, particularly image acquisition, have become prominent. Medical diagnostic devices in addition to storage phosphor screens, including CAT scanners, magnetic resonance imagers (MRI), and ultrasound imagers allow information to be obtained and stored in digital form. Although digitally stored images can be viewed and manipulated on a cathode ray tube (CRT) monitor, a hard copy of the image is almost always needed.

The most common approach for creating a hard copy of a digitally stored image is to expose a radiation-sensitive silver halide film through a series of laterally offset exposures using a laser, a light emitting diode (LED) or a light bar (a linear series of independently addressable LED's). The image is recreated as a series of laterally offset pixels. Another approach is to use the image of a CRT monitor to expose a silver halide film.

Initially the radiation-sensitive silver halide films were essentially the same films used for radiographic imaging, except the silver halide emulsion is coated on only one side of the support, since exposing light is received entirely from the front side. Another adjustment was that finer silver halide grains were substituted to minimize noise (granularity). The advantages of the types of films conventionally used for medical diagnostic imaging to provide a hard copy of the digitally stored image are that medical imaging centers are already equipped to process silver halide medical diagnostic films and are familiar with their image characteristics.

A typical film, Kodak Ektascan HN.TM., for creating a hard copy of a digitally stored medical diagnostic image includes an emulsion layer coated on a clear or blue tinted polyester film support. The emulsion layer contains a red-sensitized silver iodobromide (2.5M % I, based on Ag) cubic grain (0.33.mu.m ECD) emulsion coated at a silver coverage of 30 mg/dm.sup.2. A conventional gelatin overcoat is coated over the emulsion layer. The total hydrophilic colloid coating coverage on the front side of the support is 44.1 mg/dm.sup.2. On the back side of the support a pelloid layer containing a red-absorbing antihalation dye is coated. A gelatin interlayer, used as a hardener incorporation site, overlies the pelloid layer, and a gelatin overcoat containing an antistat overlies the interlayer. Developed silver is relied upon to provide the infrared density required to activate processor sensors. No dye is introduced for the purpose of increasing infrared absorption.

Typically silver halide diagnostic films, including the film described above, is processed in a rapid access processor in 90 seconds or less. For example, the Kodak X-OMAT M6A-N.TM. rapid access processor employs the following processing cycle:

| | |
|---|---|
| Development | 24 seconds at 35° C., |
| Fixing | 20 seconds at 35° C., |
| Washing | 20 seconds at 35° C., |
| Drying | 20 seconds at 65° C. |

with up to 6 seconds being taken up in film transport between processing steps.

A typical developer (hereinafter referred to as Developer A) exhibits the following composition:

Hydroquinone 30 g
Phenidone a 1.5 g
KOH 21 g
$NaHCO_3$ 7.5 g
$K_2SO_3$ 44.2 g
$Na_2S_2O_3$ 12.6 g
NaBr 35.0 g
5-Methylbenzotriazole 0.06 g
Glutaraldehyde 4.9 g
Water to 1 liter/pH 10.0

A typical fixer exhibits the following composition:

Sodium thiosulfate, 60% 260.0 g
Sodium bisulfite 180.0 g
Boric acid 25.0 g
Acetic acid 10.0 g
Water to 1 liter/pH 3.9–4.5

Dickerson et al U.S. Pat. No. 5,637,447 discloses a radiation-sensitive film for reproducing digitally stored medical diagnostic images through a series of laterally offset exposures by a controlled radiation source followed by processing in 90 seconds or less including development, fixing and drying is disclosed. The film exhibits an average contrast in the range of from 1.5 to 2.0, measured over a density above fog of from 0.25 to 2.0. An emulsion is provided on the front side of the support. The emulsion contains silver bromochloride grains (a) containing at least 10 mole percent bromide, based on silver, (b) having a mean equivalent circular diameter of less than 0.40.mu.m, (c) exhibiting an average aspect ratio of less than 1.3, and (d) coated at a silver coverage of less than 40 mg/dm.sup.2. Adsorbed to the surfaces of the silver bromochloride grains is at least one spectral sensitizing dye having an absorption half peak bandwidth in the spectral region of exposure by the controlled exposure source. The film also contains an infrared opacifying dye capable of reducing specular transmission through the film before, during and after processing to less than 50 percent, measured at a wavelength within the spectral region of from 850 to 1100 nm.

Dickerson et al U.S. Pat. No. 5,952,162 discloses a film capable of providing a hard copy of acceptable quality of a digitally stored medical diagnostic image through processing at the same high rates currently employed for providing medical diagnostic images in dual-coated film. That invention also eliminates any need for an anti-curl or pelloid layer.

This has been achieved by the construction of a dual-coated film structure that is capable of producing images of diagnostically acceptable quality when imagewise exposed only from the front side. It was entirely unexpected that a dual-coated film structure could be constructed to produce images of acceptable quality by front side only imagewise exposure.

EXAMPLES

The following examples describe the invention in greater detail.

Example 1

Multilayer silver halide photosensitive materials were prepared consisting of the layers outlined below. Component laydowns are provided in units of $g/m^2$. (Bisvinylsulfonyl) methane hardener was added at a level of 2.04% of total gelatin weight. Antifoggants (including 4-hydroxy-6-methyl-1,3,3a,7-tetraazaindene), surfactants, coating aids, emulsion addenda, sequestrants, lubricants, matte beads and crossover control dyes were added to the appropriate layers as described below. Each silver halide emulsion layer contained a high aspect ratio tabular silver bromide emulsion which had been chemically sensitized with sodium thiosulfate, potassium tetrachloroaurate, sodium thiocyanate and potassium selenocyanate, and spectrally sensitized with 400 mg/Ag mole of anhydro-5,5-dichloro-9-ethyl-3,3'-bis (3-sulfopropyl)oxacarbocyanine hydroxide, followed by 300 mg/Ag mole of potassium iodide.

Bottom emulsion layer (with crossover control dye): Gelatin at 1.185, AgBr emulsion (2.0×0.10 $\mu$m) at 0.75, crossover control dye at 0.108, potassium nitrate at 0.064, ammonium hexachloropalladate at 0.0001, 1,3-benzenedisulfonic acid, 4,5-dihydroxy-, disodium salt at 0.006, maleic acid hydrazide at 0.0003, sorbitol at 0.0184, glycerin at 0.023, potassium bromide at 0.0037, resorcinol at 0.015, polystyrene sulfonate, sodium salt, at 0.048, and bisvinylsulfonyl methane at 0.078.

Upper emulsion layer: Gelatin at 1.940, AgBr emulsion (3.7×0.13 $\mu$m) at 1.400, potassium nitrate at 0.119, ammonium hexachloropalladate at 0.0001, 1,3-benzenedisulfonic acid, 4,5-dihydroxy-, disodium salt at 0.0113, maleic acid hydrazide at 0.0006, sorbitol at 0.034, glycerin at 0.042, potassium bromide at 0.0068, and resorcinol at 0.028.

Interlayer: Gelatin at 0.354, AgI Lippmann emulsion at 0.011, carboxymethyl casein at 0.075, polyacrylamide at 0.054, copolymer of acrylamide and 2-acrylamido-2-methylpropane sulfonic acid, sodium salt at 0.024, chrome alum at 0.025, resorcinol at 0.058, nitron at 0.038, 4-hydroxy-6-methyl-1,3,3a,7-tetraazaindene at 0.0437, and nonylphenoxy poly(glycidol)(10) at 0.091.

Overcoat layer: Gelatin at 0.354, carboxymethyl casein at 0.075, poly(methyl methacrylate) beads at 0.0275, poly (dimethyl siloxane) lubricant at 0.091, colloidal silica at 0.107, polyacrylamide at 0.054, chrome alum at 0.0025, resorcinol at 0.0058, nonylphenoxy poly(glycidol)(10) at 0.091, and lithium trifluoromethane sulfonate at 0.038.

The overcoat layer compositions were prepared by combining an aqueous solution of gelatin, polymer matte beads, dispersed lubricant, coating aid surfactants, and other suitable addenda, and adding a solution of the fluorosurfactant. The resulting compositions were coated simultaneously with a non-image-forming interlayer and two silver image-forming layers on one side of the polyester support, using conventional multilayer coating methods. The comparison or invention fluorosurfactant was added to the overcoat composition on only one side of the film, as shown in Table 1 for samples 1–5. Also added to the overcoat layer and bottom emulsion layer of comparison sample 1 was fluorosurfactant F-4, at 4.5 $mg/m^2$ and 3 $mg/m^2$ respectively. A similar multilayer pack with two silver image-forming layers but with an overcoat layer of different composition of its coating aid surfactants and other overcoat addenda was also coated on the opposite side of the support.

The resulting radiographic film was evaluated for its electrostatic charging properties before processing and for processed density in unexposed areas (Dmin) after conditioning, for accelerated keeping, at 120 degrees F. and 50% relative humidity (RH) for 1 week. The electrostatic charging properties of pieces of each film sample were evaluated by measuring the net charge density (Q) on the side of the film with the comparison or invention fluorosurfactant after contact with and separation from EPDM (ethylene propylene diene monomer) rubber, as described in U.S. Pat. No. 5,888,712. Charging measurements were made under conditions of 70 degrees F. and 15% RH.

TABLE 1

| Sample No. | Fluoro-surfactant | Surfactant Level ($mg/m^2$) | Dmin Difference Dmin of Comparison with F-1 minus Dmin of 2, 3, 4, or 5 | Static Charge Q microCoul/$m^2$ |
|---|---|---|---|---|
| 1 (Comparison with F-1) | F-1 | 3.23 | 0 | 2.72 |
| 2 (Comparison) | F-2 | 6.24 | 0.59 | 3.55 |
| 3 (Invention) | I-1 | 6.24 | −0.02 | 3.46 |
| 4 (Invention) | I-1 | 9.36 | −0.02 | −0.90 |
| 5 (Invention) | I-1 | 12.5 | −0.01 | −2.78 |

TABLE 2

| Sample No. | Fluoro-surfactant | Surfactant Level ($mg/m^2$) | Dmin Difference Dmin of Comparison with F-1 minus Dmin of 7, 8, 9, or 10 | Static Charge Q microCoul/$m^2$ |
|---|---|---|---|---|
| 6 (Comparison with F-1) | F-1 | 3.23 | 0 | −0.56 |
| 7 (Comparison) | F-1 | 6.26 | 0.18 | −4.69 |
| 8 (Invention) | I-2 | 6.26 | −0.05 | −5.52 |
| 9 (Invention) | I-2 | 9.39 | −0.05 | −10.13 |
| 10 (Invention) | I-2 | 12.5 | −0.05 | −9.76 |

TABLE 3

| Sample No. | Fluoro-surfactant | Surfactant Level ($mg/m^2$) | Dmin Difference Dmin of Comparison with F-1 minus Dmin of others | Static Charge Q microCoul/$m^2$ |
|---|---|---|---|---|
| 11 (Comparison with F-1) | F-1 | 3.23 | 0 | 2.11 |
| 12 (Invention) | I-3 | 3.23 | −0.03 | 7.67 |
| 13 (Invention) | I-3 | 6.26 | −0.03 | 3.84 |
| 14 (Invention) | I-3 | 12.5 | −0.04 | −0.84 |
| 15 (Comparison) | F-3 | 3.23 | −0.03 | 7.38 |

TABLE 3-continued

| Sample No. | Fluoro-surfactant | Surfactant Level ($mg/m^2$) | Dmin Difference Dmin of Comparison with F-1 minus Dmin of others | Static Charge Q microCoul/$m^2$ |
|---|---|---|---|---|
| 16 (Comparison) | F-3 | 6.26 | −0.03 | 5.75 |
| 17 (Comparison) | F-3 | 12.5 | −0.04 | 3.71 |

F-1 $F_3C(CF_2)_7$—$SO_2N(H)$—$CH_2CH_2CH_2N(CH_3)_3$ [I]
F-2 $R'_f$—$CH_2CH_2$—S—$CH_2CH(OH)CH_2N(CH_3)_3$ [C1] where $R'_f$ is $C_6F_{13}$ in at least 95% and $C_8R_{17}$ in less than 4% of F-2 compounds
F-3 $F_7C_3$—$CH_2$—O(O═)$CCH_2C$(—$SO_3Na$)HC(═O)O—$CH_2$—$C_3F_7$
F-4 $C_8F_{17}$—$SO_3^-[^+N(C_2H_5)_4]$
I-1 $R'_f$—$CH_2CH_2$—S—$CH_2CH_2C$(═O)—$N(H)C(CH_3)_2CH_2SO_3Na$ where $R'_f$ is defined above
I-2 $R''_f$—$CH_2CH_2SO_2N(H)CH_2CH_2CH_2N(CH_3)_2CH_2CO_2$ where $R''_f$ is $C_6F_{13}$ in at least 97% of I-2 compounds
I-3 $R'''_f$—$CH_2CH_2$—$SO_3^-[^+NR_4]$ where $R'''_f$ is $C_6F_{13}$ in about 90% and $C_8F_{17}$ in about 10% of I-3 compounds, where $R_4$ is a mixture of —$H_4$ and —$(C_2H_5)_4$

F-1 $F_3C(CF_2)_7$—$SO_2$ N(H)—$CH_2CH_2CH_2$ N $(CH_3)_3$ [I]

F-2 $R'_f$—$CH_2CH_2$—S—$CH_2CH(OH)$ $CH_2$ N $(CH_3)_3$[Cl]

where $R'_f$ is $C_6F_{13}$ in at least 95% and $C_8R_{17}$ in less than 4% of F-2 compounds F-3 $F_7C_3$-$CH_2$—O(O═)$CHH_2C$(—$SO_3$ Na)HC(═O)O—$CH_2$—$C_3F_7$

F-4 $C_8F_{17}$—$SO_3^-[^+N(C_2H_5)_4]$

I-1 $R'_f$—$CH_2CH_2$—S—$CH_2CH_2C$(═O)—N(H) $C(CH_3)_2$ $CH_2SO_3$ Na where $R'_f$ is defined above I-2 $R''_f$—$CH_2CH_2SO_2N(H)CH_2CH_2CH_2N(CH_3)_2CH_2CO_2$ where $R''_f$ is $C_6F_{13}$ in at least 97% of I-2 compounds I-3 $R'''_f$—$CH_2CH_2$—$SO_3^-[^+NR_4]$ where $R'''_f$ is $C_6F_{13}$ in about 90% and $C_8F_{17}$ in about 10% of 1–3 compounds, where $R_4$ is a mixture of —$H_4$ and —$(C_2H_5)_4$ The electrostatic charging measurements described above were used to predict favorable static charging properties in automatic film changer equipment. In general, static charge values after contact with EPDM rubber in the range of −1.0 to +3.0 microcoulombs/$m^2$ were shown to correlate well with little or no static marking of the film when transported in changer equipment, with a preferred range being 0 to 3.0 microcoulombs/$m^2$. In Example 1 (Table 1), comparison sample 1 had favorable static charging properties. Static charging measurements of samples 3–5 show that increased levels of addition of invention fluorosurfactant I-1 resulted in reduced positive charging values or even negative charging values at higher levels. Favorable values in the desired range could be obtained with an intermediate level of invention fluorosurfactant I-1. Dmin values which are as low as possible are preferred for radiographic films, because increased Dmin results in reduced contrast and decreased ability to detect detail in exposed areas of low image density. In Example 1, the Dmin values of samples 2–5 are compared with comparison sample 1 and expressed as differences, that is, the value of the Dmin of sample 1 minus the Dmin of the other samples. The Dmin value of comparison sample 2 is greater than that of sample 1, which is unfavorable, but the Dmin values of samples 3–5 with invention fluorosurfactant I-1 are less than that of sample 1, which is favorable.

Example 2

Table 2

Multilayer silver halide materials were prepared and evaluated as described in Example 1 except that the fluorosurfactants added to the overcoat layer on one side were varied as shown in samples 6–10 in Table 2. Also added to the overcoat layer and bottom emulsion layer of comparison sample 6 was fluorosurfactant F-4, at 4.5 $mg/m^2$ and 3 $mg/m^2$ respectively. Static charging measurements of comparison sample 6 show that its charging properties are in the desired range, and measurements of samples 8–10 with invention fluorosurfactant I-2 indicate that the amounts added to the overcoat were higher than necessary. An added amount of I-2 less than that in sample 8 would be sufficient for favorable charging properties. The Dmin values of samples 7–10 are compared with the Dmin value of comparison sample 6. The Dmin values of samples 8–10 with invention fluorosurfactant I-2 are less than that of sample 6, which is favorable.

Example 3

Table 3

Multilayer silver halide materials were prepared and evaluated as described in Example 1 except that the fluorosurfactants added to the overcoat layer on one side were varied as shown in samples 11–17 in Table 3. Also added to the overcoat layer and bottom emulsion layer of comparison sample 11 was fluorosurfactant F-4, at 4.5 $mg/m^2$ and 3 $mg/m^2$ respectively. Static charging measurements of comparison sample 11 show that its charging properties are in the desired range, but measurements of comparison samples 15–17 with comparison fluorosurfactant F-3 are too highly positive. Measurements of samples 12–14 with invention fluorosurfactant I-3 indicate that an amount close to the highest level evaluated (sample 14) would be sufficient for favorable charging properties. The Dmin values of samples 12–17 were compared with the Dmin value of comparison sample 11, and they were all less than that of sample 11, which is favorable.

The invention has been described in detail with particular reference to certain preferred embodiments thereof, but it will be understood that variations and modifications can be effected within the spirit and scope of the invention.

What is claimed is:

1. A coating composition for use in forming an overcoat layer in a photographic element, said composition comprising an aqueous solution of:

two or more surfactants, where only one of the surfactants is fluorinated;

a hydrophilic binder; and matte particles;

wherein the only one fluorinated surfactant is represented by the following Formula (I):

$$R_f—CH_2CH_2—(B)_y\text{-}A \qquad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or a betaine group.

2. The coating composition of claim 1 where n is 3 in at least 60% of the $R_f$ groups present.

3. The coating composition of claim 1 where n is 3 in at least 90% of the $R_f$ groups present.

4. The coating composition of claim 1 wherein A in Formula I is a sulfonate group with a substituted ammonium counterion.

5. The coating composition of claim 1 wherein A in Formula I is a betaine group.

6. The coating composition of claim 1 further containing at least one surfactant, not represented by Formula I, that is selected from the group consisting of alkyl aryl polyether sulfates, alkyl aryl polyether sulfonates, alkyl sulfosuccinate esters, alkyl aryl polyglycidols, and alkyl polysaccharide ethers.

7. The coating composition of claim 1 further containing at least one surfactant, not represented by Formula I, that is selected from the group consisting of nonylphenoxy-poly (glycidol)(10) and alkyl mono- and oligo-glucopyranoside.

8. The coating composition of claim 1 further containing a lubricant.

9. The coating composition of claim 8 wherein the lubricant is a poly(dimethyl siloxane).

10. The coating composition of claim 1 wherein the matte bead is polymer comprising acrylic or vinyl aromatic monomers.

11. The coating composition of claim 1 wherein the binder is gelatin.

12. A coating composition for use in a photographic element, said composition comprising an aqueous solution of:

two or more surfactants, where only one of the surfactants is fluorinated; and a hydrophilic binder;

wherein the only one fluorinated surfactant is represented by the following Formula (I):

$$R_fCH_2CH_2—(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or a betaine group.

13. A photographic element comprising:

a) a support;

b) at least one image-forming layer; and c) an overcoat layer comprising:

i) two or more surfactants, where only one of the surfactants is fluorinated;

ii) a hydrophilic binder; and iii) matte particles;

wherein the only one fluorinated surfactant is represented by the following Formula (I):

$$R_fCH_2CH_2—(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or a betaine group.

14. The photographic element of claim 13 wherein $R_f$ is $F(CF_2CF_2)_n$— and n is 3 and 4 or 3, 4, and 5, and the fraction of all $R_f$ with n=3 is at least 60%.

15. The photographic element of claim 13 wherein the surfactant represented by Formula (I) in the overcoat layer is present in an amount between 0.1 and 25 milligrams per square meter.

16. The photographic element of claim 13 wherein the surfactant represented in Formula (I) in the outermost layer is present in an amount between 0.5 and 15 milligrams per square meter.

17. A photographic element comprising:

a) a support;

b) at least one image-forming layer; and c) at least two surfactants, where only one of the surfactants is fluorinated;

wherein the only one fluorinated surfactant is represented by the following Formula (I):

$$R_fCH_2CH_2—(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or a betaine group.

18. A method of providing control of static charge for a photographic element, the method comprising the steps of providing a photographic element, coating its outermost layer with a fluorinated surfactant coating composition and drying said coating, said coating composition comprising:

i) a mixture of two or more surfactants, where only one of the surfactants is fluorinated;

ii) a hydrophilic binder; and iii) matte particles;

wherein the only one fluorinated surfactant is represented by the following Formula (I)

$$R_fCH_2CH_2—(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is an anionic sulfonate group with a counterion or a betaine group.

19. A photographic element comprising:

a) a support;

b) at least one image-forming layer; and c) an overcoat layer comprising:

i) two or more surfactants, where only one of the surfactants is fluorinated;

ii) a hydrophilic binder; and iii) matte particles;

wherein the only one fluorinated surfactant is represented by the following Formula (I):

$$R_f—CH_2CH_2—(B)_y\text{-}A \quad (I)$$

where $R_f$ is $F(CF_2CF_2)_n$— and n is 3 and 4 or 3, 4, and 5, and the fraction of all $R_f$ with n=3 is at least 40%;

B is a divalent linking group;

y is 0 or 1; and

A is $—N^+(CH_3)_2—CH_2C(=O)O^-$.

20. A photographic element comprising:

a)a support;

b) at least one image-forming layer; and c) an overcoat layer comprising:

i) two or more surfactants, where only one of the surfactants is fluorinated;

ii) a hydrophilic binder; and iii) matte particles;

wherein the only one fluorinated surfactant is $R_f$—] $CH_2CH_2—SO_3^-$[$^+NR_4$— or $R_f—CH_2CH_2SO_2N(H)CH_2CH_2CH_2N^+(CH_3)_2CH_2CO_2^-$ wherein $NR_4$ is a substituted ammonium ion, $R_f$ is $F(CF_2CF_2)_n$—, and n is 3 and 4 or 3, 4, and 5, and the fraction of all $R_f$ with n=3 is at least 40%.

* * * * *